Patented Aug. 16, 1932

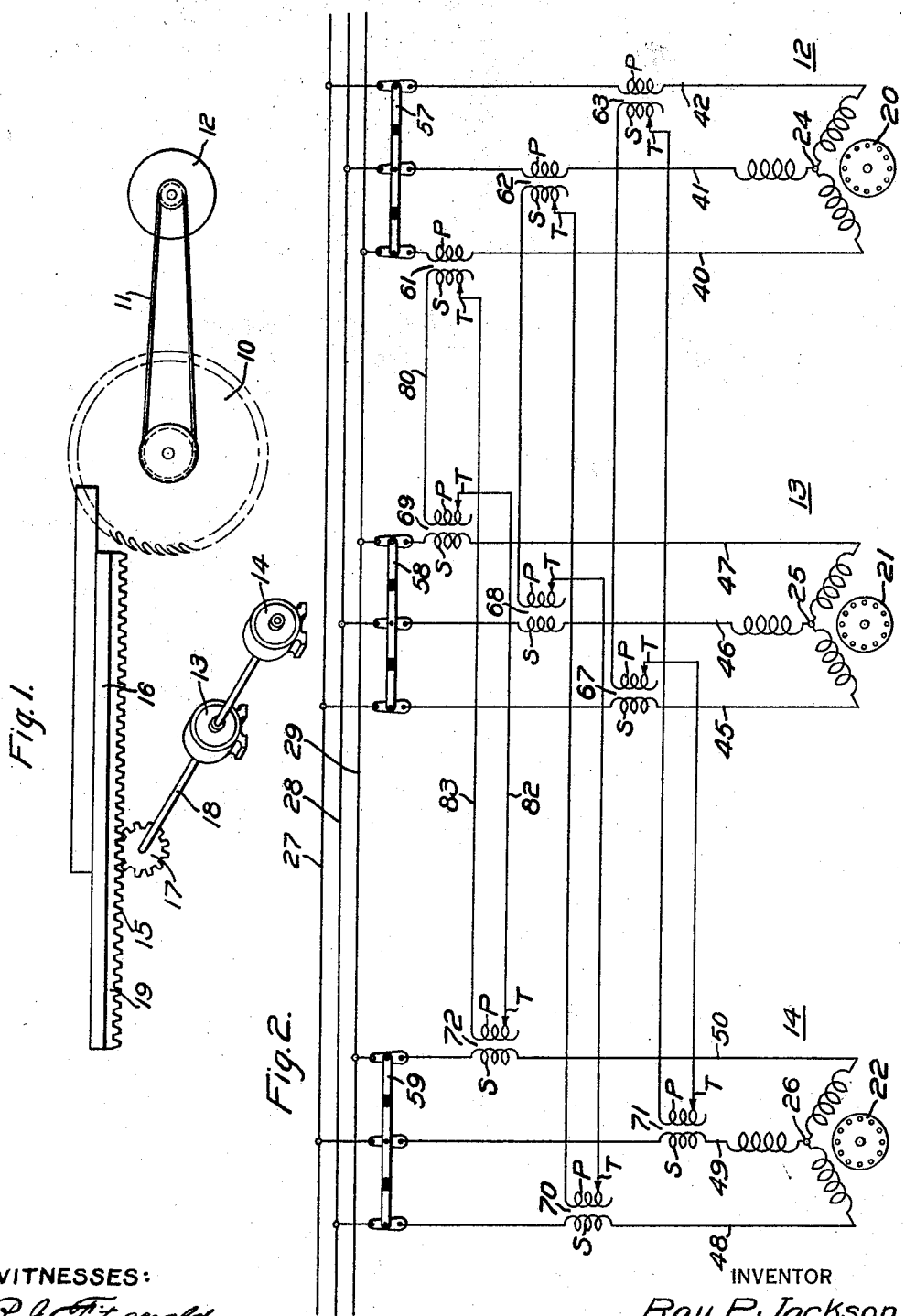

1,871,696

UNITED STATES PATENT OFFICE

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed March 24, 1931. Serial No. 524,786.

My invention relates, generally, to control systems and, more particularly, to control systems which may be utilized to feed a tool and the material to be worked into cooperative relation.

The object of my invention, generally stated, is the provision of a control system that shall be simple and efficient in operation and be readily and economically manufactured and installed.

A more specific object of my invention is to provide for so feeding a tool and the material to be worked into cooperative relation that the pressure between the tool and the material shall be inversely proportional to the resistance encountered by the tool, when the resistance is less than a predetermined value, and for retracting the tool and the material from such cooperative relation, when the resistance is more than the said predetermined value.

Another object of my invention is to provide for feeding a tool and the material to be worked into cooperative relation when the load encountered by the tool is less than a predetermined value and for retracting the tool and the material from such cooperative relation when the resistance is more than the said predetermined value by differentially varying the voltage impressed upon a pair of feed motors connected to produce torques in opposite directions.

Another object of my invention is to provide, in a control system, for feeding a tool and the material to be worked into cooperative relation, means for establishing a plurality of load settings, whereby the tool and the material will be retracted from such cooperative relation when the load exceeds the value represented by a load setting.

Other objects of the invention will hereinafter become apparent.

This invention, accordingly, is disclosed in the accompanying drawing and comprises the features of construction, the combination of elements and the arrangement of parts which will be exemplified in the construction hereinafter set forth and the scope of the application of which will be indicated in the claims.

For a fuller understanding of the nature and the objects of the invention, reference should be had to the following detailed description, taken in connection with the accompanying drawing, in which:

Figure 1 is a view, partially in side elevation and partially in perspective, of a work saw and feed carriage showing, generally, the manner in which a control system, embodying the features of my invention, may be applied.

Fig. 2 is a diagrammatic view of a control circuit and apparatus embodying the features of my invention.

Although my invention is capable of general application, it is particularly useful to control the feed to a tool which is subjected to a varying load. Inasmuch as my invention may be applied generally to feeding a tool and the material to be worked into cooperative relation, only a showing of the essential parts of such tool is included in the drawing.

Referring now to Fig. 1 of the drawing, 10 designates, generally, a work saw driven by a motor 12 which may be connected to the work saw by any suitable means, such, for example, as a belt 11. In order to feed the material to be worked and the saw into cooperative relation, a feed carriage 16, disposed to be actuated by a rack-and-pinion drive, is provided. The rack-and-pinion drive comprises a pinion 17, which is mounted on a shaft 18, and a rack member 19, having teeth 15 which mesh with the teeth of the pinion.

In order to provide for actuating the feed carriage, whereby the work and the saw shall be fed into cooperative relation when the load encountered by the motor 12 is less than a predetermined value, and for retracting the work and saw from such cooperative relation when the load is more than the said predetermined value, a pair of substantially balanced motors 13 and 14, the rotors of which are mounted on the shaft 18, are provided.

As shown in Fig. 2, the motors 12, 13 and 14 are provided, respectively, with squirrel-cage rotors 20, 21 and 22 and with star connected polyphase stator windings 24, 25 and 26. Accordingly, a source of polyphase power, comprising line conductors 27, 28 and 29, is provided for operating the motors.

Preferably, as shown in Fig. 2, the stator windings 24, 25 and 26 are, respectively, connected to the power source by individual circuits comprising the conductors 40, 41 and 42, the conductors 45, 46 and 47, and the conductors 48, 49 and 50. For the purpose of operating the motors independently, a plurality of switches 57, 58 and 59 are connected between each individual motor circuit and the power source.

In order to cause the motors 13 and 14 to develop torque in opposite directions, thereby producing a differential torque for actuating the carriage 16, the stator windings 25 and 26 are connected oppositely to the power source. In this particular embodiment of the invention, the motor 13 is disposed to develop a larger torque than that developed by the motor 14 when substantially the same voltage is impressed upon each motor. When operating under this condition, the differential torque produced by the two motors will be of such direction as to cause the carriage to feed the work to the saw. However, the motor 14 is disposed to develop a larger torque than that developed by the motor 13 when the voltage impressed upon the motor 13 is decreased to a predetermined value and when the voltage on the motor 14 is, correspondingly, increased to a predetermined value. When operating under this condition, the differential or resultant torque will be in such direction as to cause the carriage to retract the work from the tool. Likewise, it will be readily understood that the speed at which the work is being fed to the tool gradually decreases as the torque produced by the motor 14 approaches that produced by the motor 13. In other words, the differential torque action is such as to maintain a substantially constant load on the saw at all times.

In order to vary the voltages impressed upon the motors 13 and 14, thereby controlling the relative values of the torque in accordance to the load encountered by the motor 12, a plurality of current transformers, which are connected in series-circuit relation to each of the motors, are provided.

The current transformers 61, 62 and 63, which are connected in circuit relation to the motor 12, have their primary windings P respectively connected in series with the conductors 40, 41 and 42. On the other hand, the current transformers 67, 68 and 69, which are connected in circuit relation to the motor 13, and the current transformers 70, 71 and 72, which are connected in circuit relation to the motor 14, have their secondary windings S respectively, connected in series with the conductors 45, 46 and 47 and the conductors 48, 49 and 50.

In order to provide for varying the relative torque values of the motors 13 and 14, in response to the load on the motor 12, the secondary windings S of the transformers 61, 62 and 63 are connected in series-circuit relation to the primary windings of the transformers, which are connected in circuit relation to the motors 13 and 14. As shown in Fig. 2, the primary windings of the current transformers 69 and 72 are connected in series with the secondary winding of the transformer 61 by conductors 80, 82 and 83. As will be readily understood, the current induced in the secondary winding of the current transformer 61, caused by variations in the current traversing the primary windings of the motor 12, will flow through the conductor 80, the primary winding P of the transformer 69, the conductor 82, the primary winding P of the transformer 72 and the conductor 83 to the opposite terminal of the secondary windings of transformer 61. By a similar arrangement of circuits, the current induced in the secondary windings of the transformers 62 and 63 will flow, respectively, through the primary windings P of the transformers 68 and 70 and the primary windings P of the transformers 67 and 71.

For the purpose of differentially varying the voltage impressed upon the motors 13 and 14, the primary windings of the transformers 67, 68 and 69 and the primary windings of the transformers 70, 71 and 72 are connected oppositely to the secondary windings S of the transformers 61, 62 and 63. Accordingly, the voltage impressed on the motor 13 decreases and that impressed upon the motor 14 increases as the load on the motor 12 increases.

In the operation of the system, when the load encountered by the motor 12 is light, the voltage impressed upon the motors 13 and 14 will be substantially the same, and, consequently, the carriage will be actuated to feed the work to the tool, because the torque produced by the motor 13 is greater than that produced by the motor 14. As the work is being fed to the tool, the load will naturally increase, and, consequently, the voltage impressed on the motor 13 will be decreased and that impressed upon the motor 14 will be increased, thereby reducing the speed at which the work is being fed to the tool. Since the speed is reduced, the load will be correspondingly decreased and, consequently, the speed at which the work is being fed to the tool will be again increased. The effect of such operation is that the load imposed upon the motor 12 will be automatically maintained at a substantially constant value, regardless of the resistance encountered by the tool. However, in case the motor 12 should become stalled, then the load would exceed a predetermined value, and accordingly, the work would be retracted from the tool, because the torque produced by the motor 14 would be greater than that produced by the motor 13.

In order to change the value of the load at which the torque produced by the motor 13 shall exceed that of the motor 14, the transformers are provided with a plurality of variable connections or taps T. As will be observed, by changing the taps, the effectiveness of the transformers are, accordingly, changed and, therefore, the load value at which the work is retracted from the tool may be changed.

Therefore, it will be readily understood that I have disclosed a control system for feeding work to a tool when the resistance encountered by the tool is less than a predetermined value and for retracting the work from the tool when the resistance is more than the said predetermined value.

While the illustrated example constitutes a practical embodiment of my invetnion, I do not limit myself strictly to the exact details herein illustrated, since the structure may be considerably varied without departing from the spirit of the invention as defined in the appended claims.

I claim as my invention:

1. The combination with a work-device comprising a tool and a carriage for bringing the tool and the material to be worked into cooperative relation, of a main motor for actuating the tool, a feeding motor and a retracting motor for actuating the carriage, a source of power for the motors, individual circuits for connecting the respective motors to the power source, means for interrupting each of the individual circuits the feeding motor and the retracting motor being so connected to the power source as to develop torques in opposite directions, the torque characteristic of the feeding motor being such that the said motor develops a torque larger than that developed by the retracting motor when the load of the main motor is less than a predetermined selected value, and a plurality of transformers connected in each of said individual circuits, said transformers being so connected as to differentially vary the energization of the feeding motor and the retracting motor that the torque developed by the retracting motor shall be larger than that developed by the feeding motor when the load of the main motor is greater than the said predetermined selected value.

2. The combination with a work-device comprising a tool and a carriage for bringing the tool and the material to be worked into cooperative relation, of a main motor for actuating the tool, a plurality of feed motors for actuating the feed carriage, a source of power for the motors, said feed motors being so connected to the power source as to develop torques in opposite directions, means responsive to the load on the main motor for so varying the energization of the feed motors that the tool and the material are fed into cooperative relation when the load of the main motor is less than a predetermined selected value and that the tool and material are retracted from such cooperative relation when the load exceeds said predetermined selected value, and means for varying the effectiveness of the load-responsive means, thereby affording a plurality of predetermined selected values at which the tool may be retracted from cooperative engagement with the material being worked.

3. The combination with a work-device comprising a tool and a carriage for bringing the tool and the material to be worked into cooperative relation, of a main motor for actuating the tool, a feeding motor and a retracting motor for actuating the carriage, a source of power for the motors, individual circuits for connecting each motor to the power source, the feeding motor and the retracting motor being so connected to the power source as to develop torques in opposite directions, said feeding motor being disposed to develop a greater torque than the retracting motor with substantially the same voltage impressed upon them, and a plurality of transformers connected in each of said individual circuits, said transformers being so interconnected as to differentially vary the voltage impressed upon the feeding and the retracting motors in accordance with the variations in the load on the main motor, thereby causing the tool and the material to be worked to be fed into cooperative relation when the difference between the voltages impressed upon the feeding and the retracting motor is less than a predetermined selected value, and causing the tool and the material to be retracted from such cooperative relation when the said difference between the voltages impressed upon the feeding and the retracting motor is more than said predetermined selected value.

4. The combination with a work-device comprising a tool and a carriage for bringing the tool and the material to be worked into cooperative relation, of a main motor for actuating the tool, a feeding motor and a retracting motor for actuating the carriage, a source of power for the motors, individual circuits for connecting each motor to the power source, the feeding motor and the retracting motor being so connected to the power source as to develop torques in opposite directions, said feeding motor being disposed to develop a greater torque than the retracting motor with substantially the same voltage impressed upon them, a plurality of transformers connected in each of said individual circuits, said transformers being so interconnected as to differentially vary the voltage impressed upon the feeding and the retracting motors in accordance with the variations in the load on the main motor, thereby causing the tool and the material to be worked to be fed into cooperative relation when the difference between the voltages impressed upon the feeding and the retracting motor is less than a predetermined selected value, and causing the tool and the material to be retracted from such cooperative relation when the said difference between the voltages impressed upon the feeding and the retracting motor is more than said predetermined selected value, and means for varying the rate at which the voltage that is impressed upon the feeding motor and the voltage that is impressed upon the retracting motor is differentially varied.

In testimony whereof, I have hereunto subscribed my name this 19th day of March, 1931.

RAY P. JACKSON.